T. E. KNOWLTON, P. H. MacCORQUODALE, J. H. WYCKOFF, C. H. RUSSELL & J. N. TOOKER.
CARTON HANDLING MACHINE.
APPLICATION FILED AUG. 14, 1913.
1,220,643.
Patented Mar. 27, 1917.
8 SHEETS—SHEET 2.
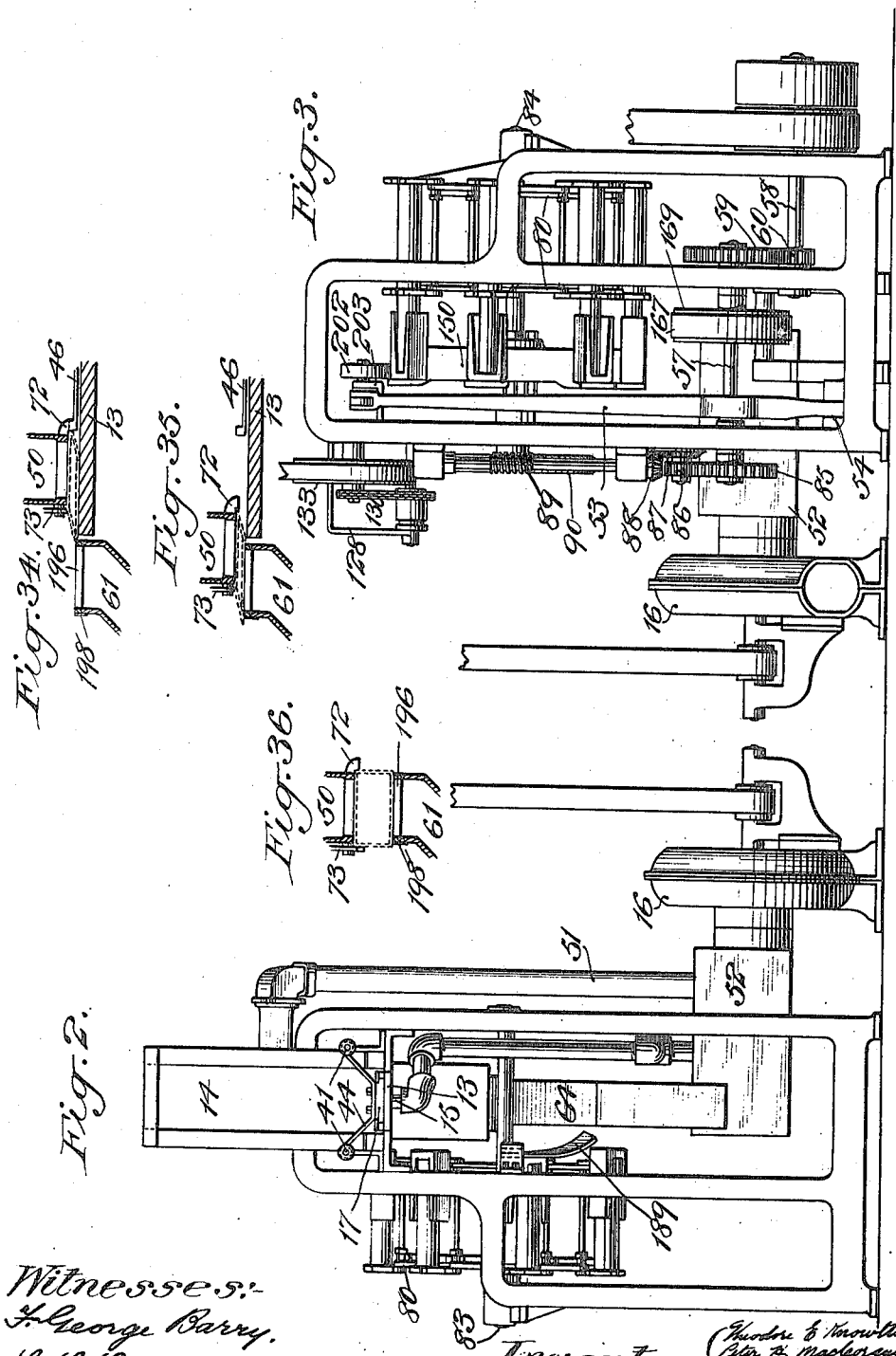

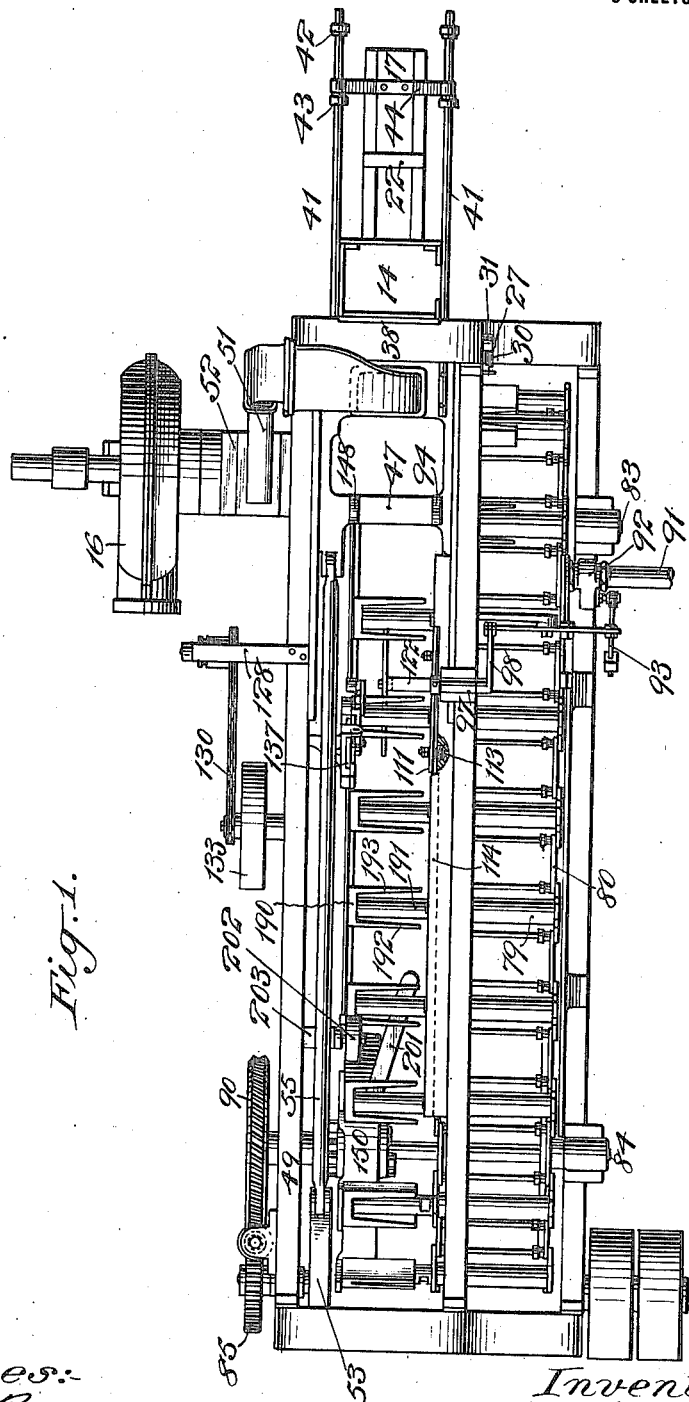

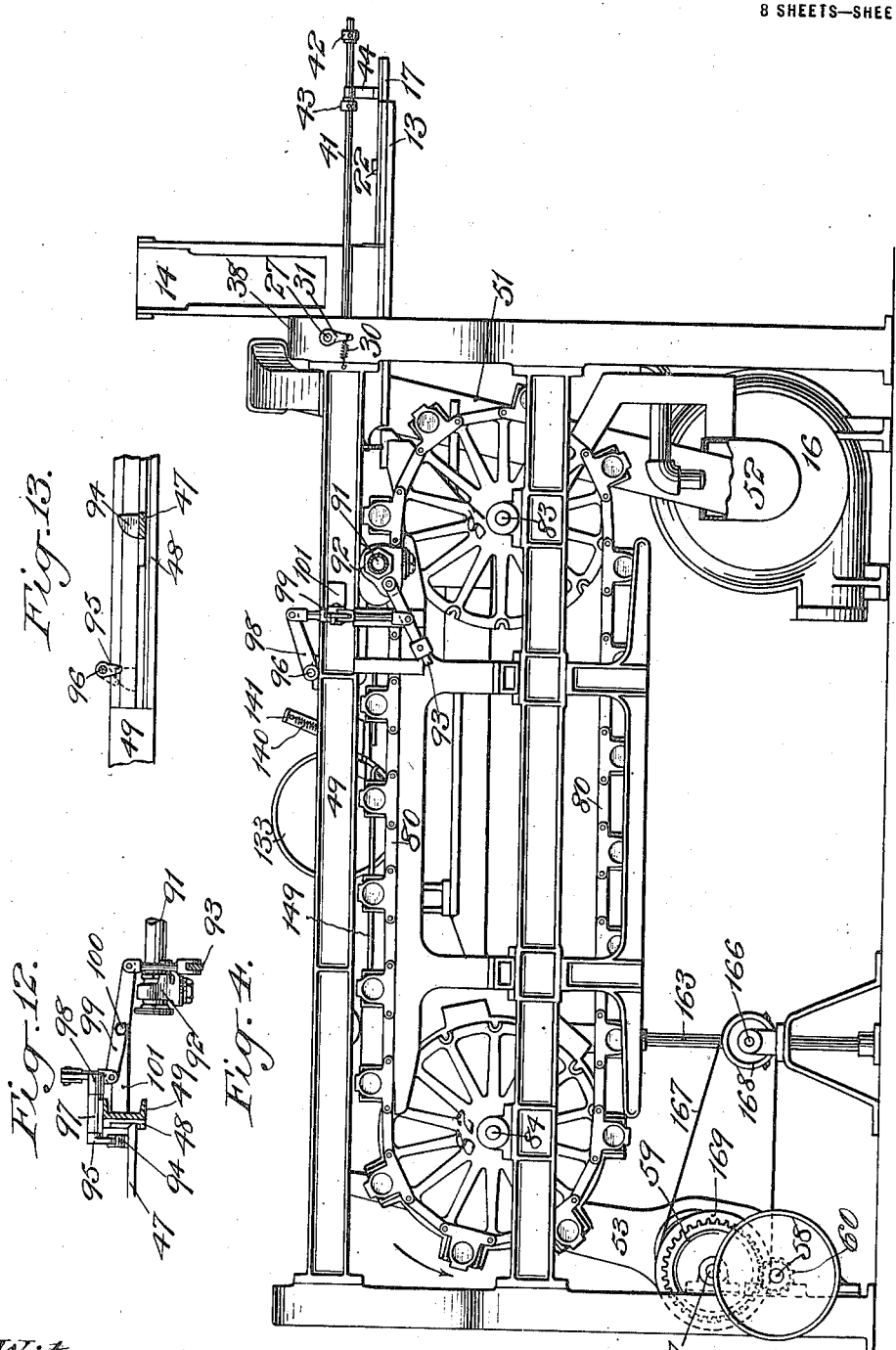

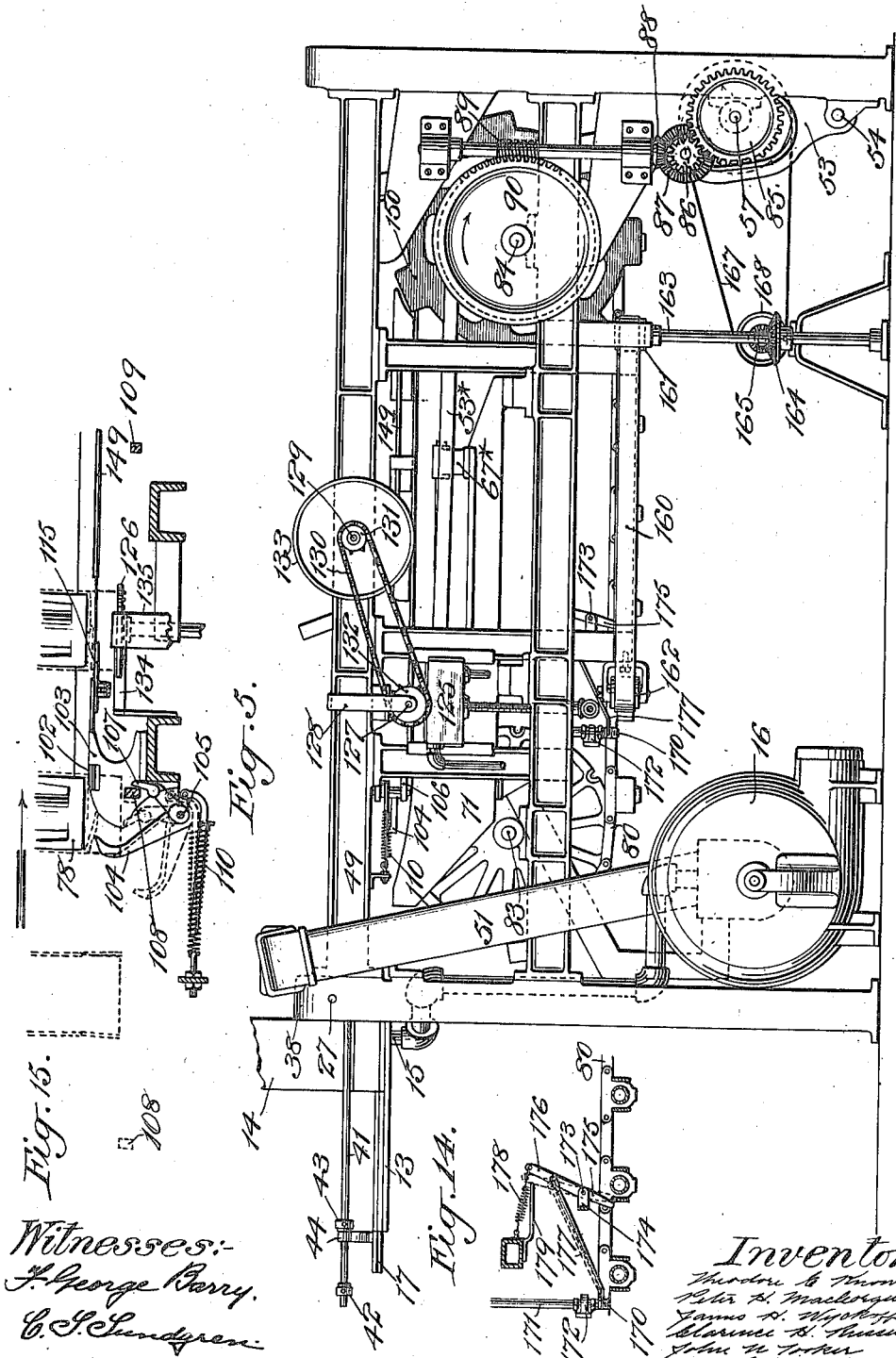

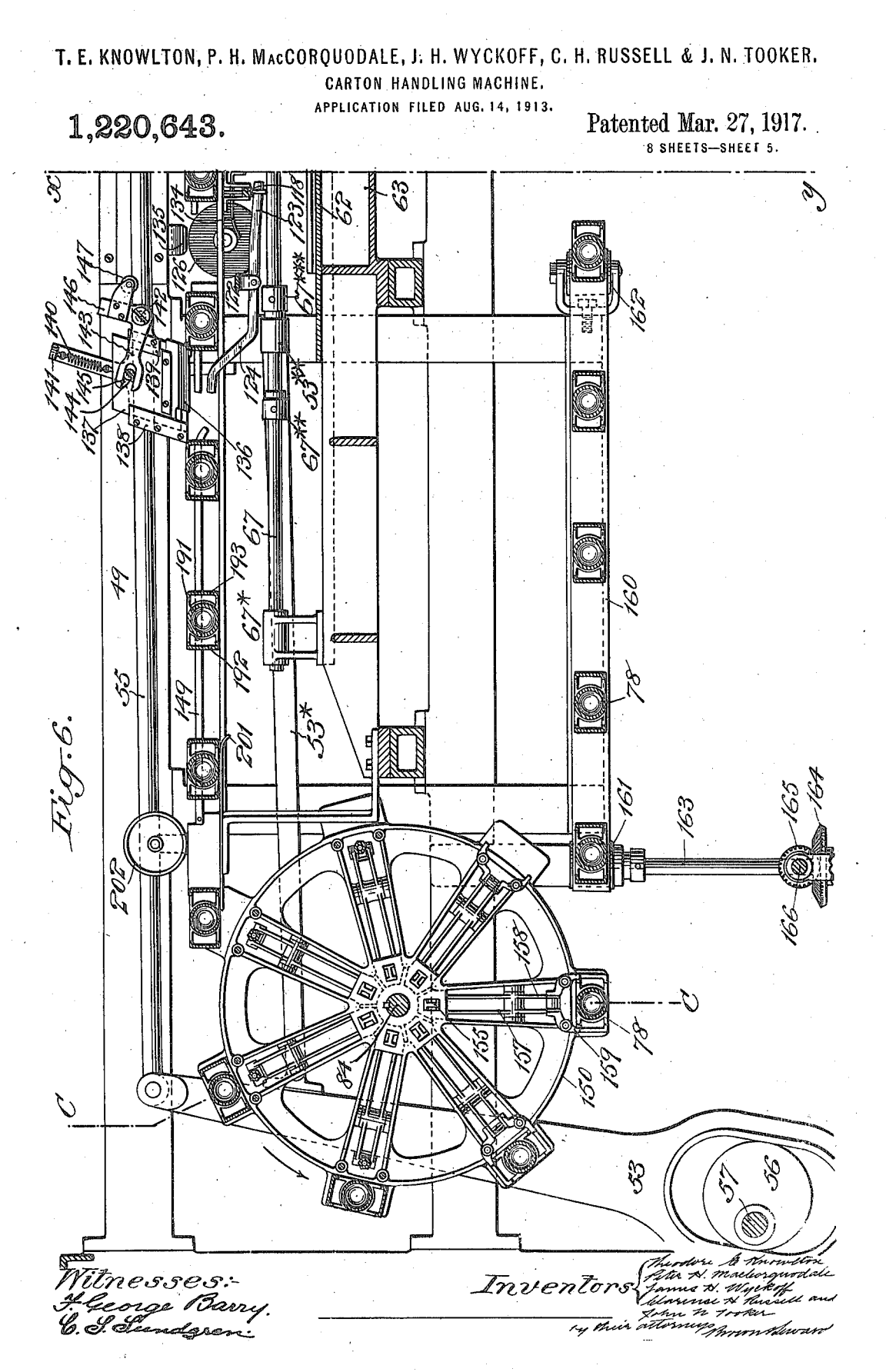

T. E. KNOWLTON, P. H. MacCORQUODALE, J. H. WYCKOFF, C. H. RUSSELL & J. N. TOOKER.
CARTON HANDLING MACHINE.
APPLICATION FILED AUG. 14, 1913.

1,220,643.

Patented Mar. 27, 1917.
8 SHEETS—SHEET 5.

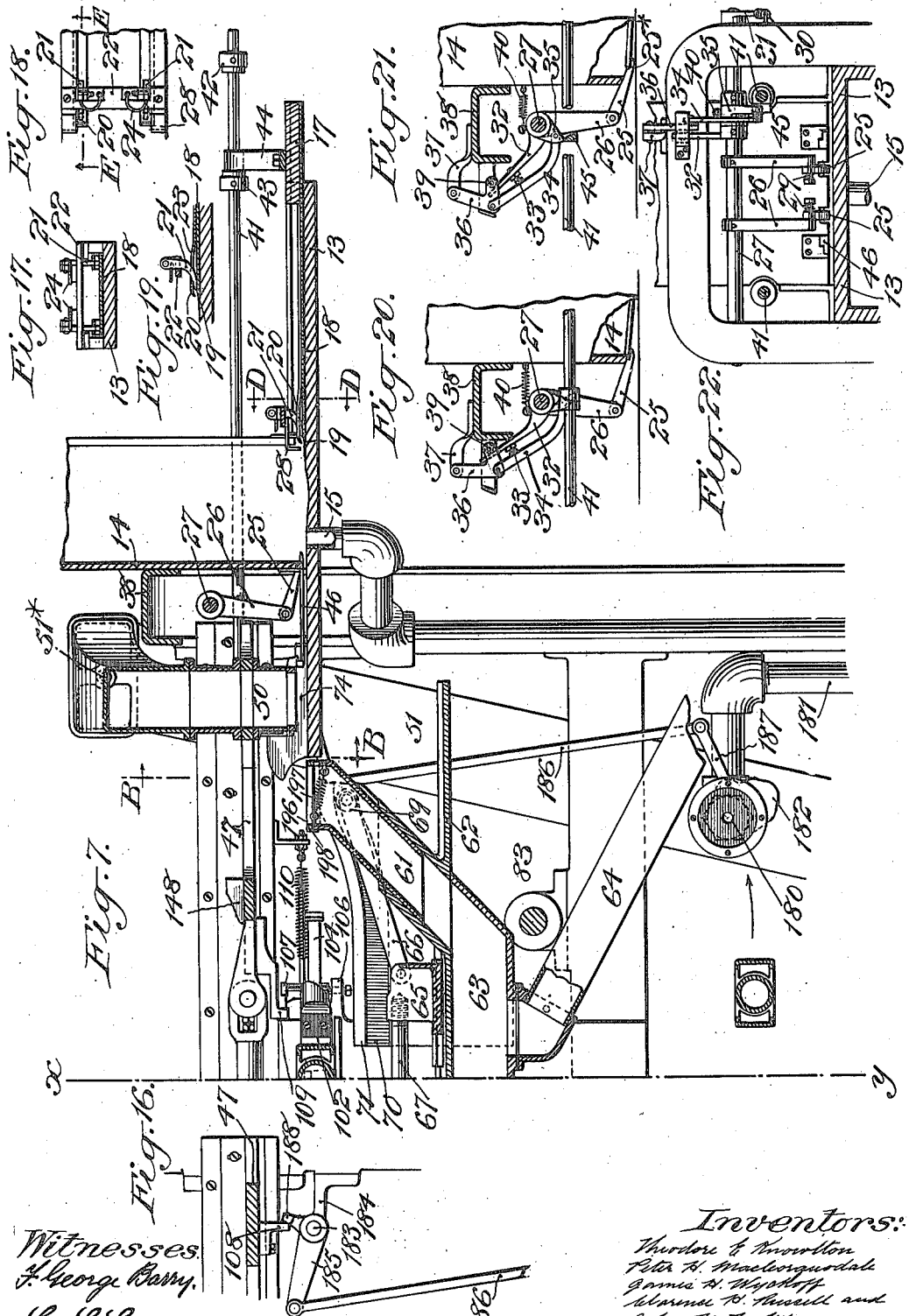

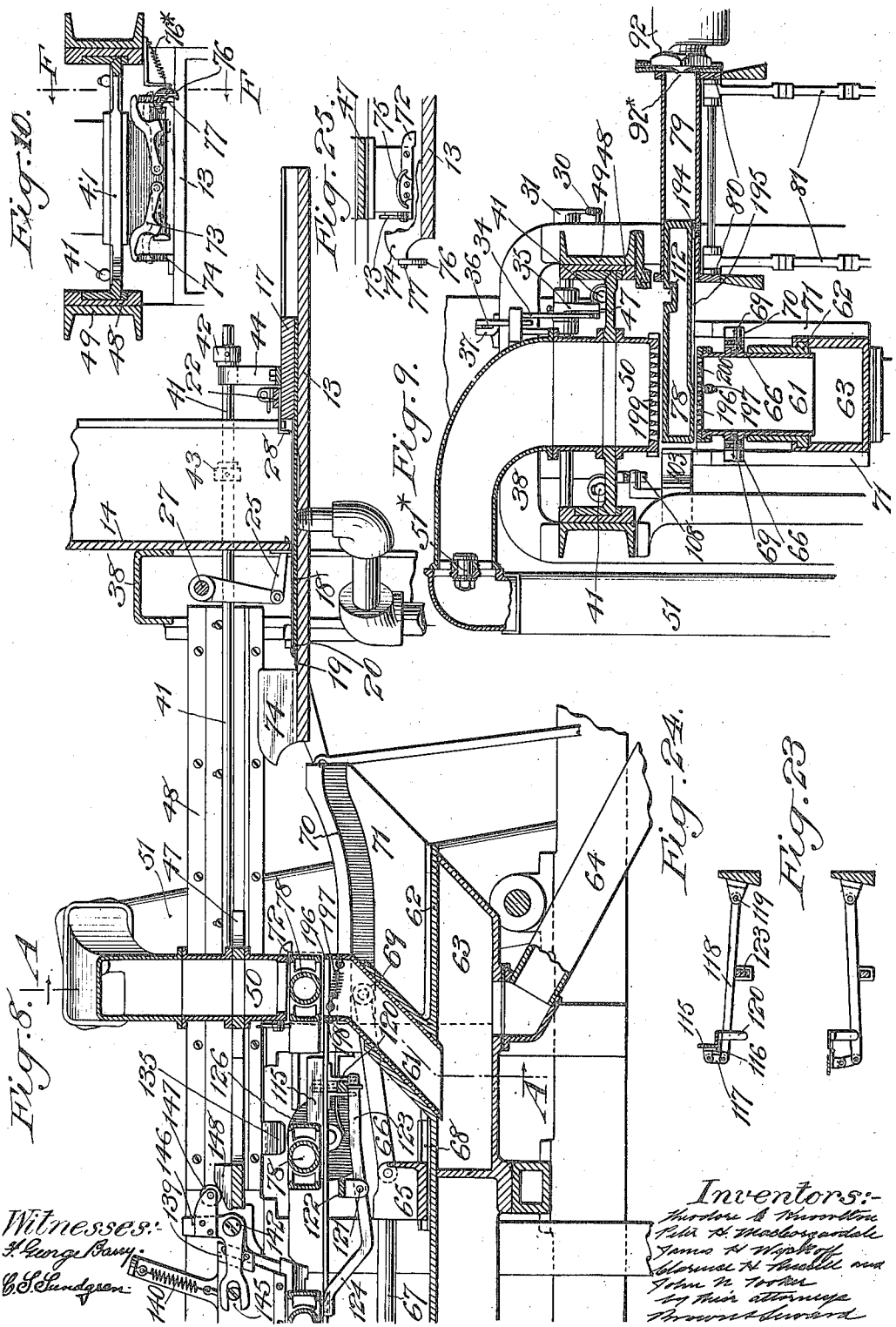

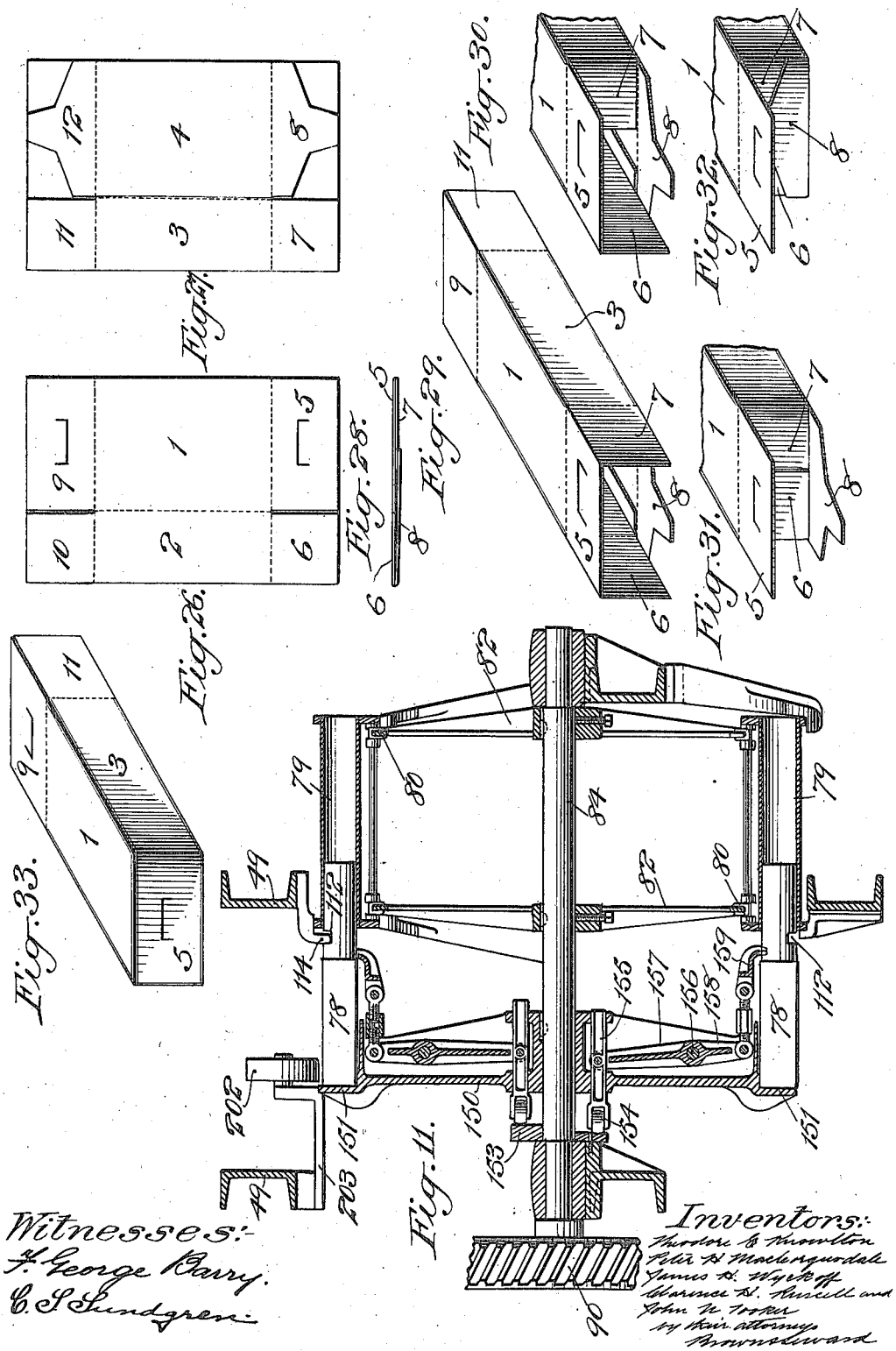

UNITED STATES PATENT OFFICE.

THEODORE E. KNOWLTON, OF ELBA, AND PETER H. MacCORQUODALE, JAMES H. WYCKOFF, CLARENCE H. RUSSELL, AND JOHN N. TOOKER, OF SYRACUSE, NEW YORK, ASSIGNORS TO CHURCH & DWIGHT COMPANY, OF NEW YORK, N. Y., A CORPORATION OF NEW YORK.

CARTON-HANDLING MACHINE.

1,220,643. Specification of Letters Patent. Patented Mar. 27, 1917.

Application filed August 14, 1913. Serial No. 784,753.

*To all whom it may concern:*

Be it known that we, THEODORE E. KNOWLTON, a citizen of the United States, and resident of Elba, in the county of Genesee and State of New York, and PETER H. MacCORQUODALE, JAMES H. WYCKOFF, CLARENCE H. RUSSELL, and JOHN N. TOOKER, citizens of the United States, and residents of Syracuse, in the county of Onondaga and State of New York, have invented new and useful Improvements in Carton-Handling Machines, of which the following is a specification.

The object of this invention is to provide a machine having mechanisms for successively feeding in collapsed cartons one by one to a predetermined point, opening up the carton, folding the flaps at one end of the carton together, sealing said flaps, and finally ejecting the carton with one end sealed and the other end opened ready for filling.

The invention consists in certain improvements in the construction, form and arrangement of the several parts of a carton handling machine whereby the above objects may be carried out in a simple, rapid and effective manner.

The invention more specifically comprises means for feeding collapsed cartons one by one from a source of supply such as a pile, into the machine; means for opening up the carton by suction applied to the upper and lower sides thereof and holding the carton in its opened position by suction while a former mounted on a traveling endless carrier is forced into the carton by fluid pressure; means for moving the carton with its former away from the suction means after the former has been inserted into the carton and for removing the fluid pressure from the former and substituting therefor mechanical means for holding the former in its position within the carton as the former and carton are moved by the traveling carrier.

Mechanisms are also employed for subjecting the flaps at one end of the carton to successive folding operations and means are employed for applying an adhesive to the under side of the last folded flap and for holding the flaps in their folded position as the cartons are moved along by their carrier to permit the permanent sealing of the flaps.

Means are also employed for applying an extra pressure to the folded end of the carton while the carton is moving toward its point of delivery.

Means are also employed for blowing the carton from its former at the delivery point and for blowing the former back to its original position ready to be forced into another carton; where the cycle of operations is repeated. Auxiliary means are also provided for insuring the return of the former to its original position after the carton has been delivered.

A practical embodiment of the invention is represented in the accompanying drawings, in which—

Figure 1 represents the machine in top plan,

Fig. 2 is a view of the machine in front elevation,

Fig. 3 is a view of the machine in rear elevation,

Fig. 4 is a view of the machine in side elevation, looking toward the left side of the machine, Fig. 5 is a view of the machine in side elevation looking toward the right side of the machine, Fig. 6 is an enlarged detail vertical section taken from front to rear through the machine showing the rear portion thereof, Fig. 7 is a similar view showing the front portion of the machine, Fig. 8 is a view similar to Fig. 7 with certain of the parts in different operative positions, Fig. 9 is a detail transverse section taken in the planes of the line A—A of Fig. 8, Fig. 10 is a detail section taken in the plane of the line B—B of Fig. 7, Fig. 11 is a detail section taken in the planes of the line C—C of Fig. 6, Fig. 12 is a detail view showing the mechanism for controlling the movement of the former into the opened carton, Fig. 13 is a detail view showing the cams for operating said mechanism, Fig. 14 is a detail section showing the mechanism for controlling the discharge of the carton from the traveling former, Fig. 15 is a detail horizontal section showing a portion of the end flap folding mechanism, Fig. 16 is a detail section showing the mechanism for controlling the blowing of the former back to its original position, Fig. 17 is a detail section taken in the plane of the line D—D of Fig. 7, showing the feeding in means for the collapsed carton, Fig. 18 is a detail top plan view of the same, Fig. 19 is a detail section taken in the plane of the line E—E of Fig. 18, Fig. 20 is a detail section showing the means for controllng the pile of collapsed cartons with the parts in one position, Fig. 21 is a similar view with the parts in another position, Fig. 22 is a transverse detail section showing the parts illustrated in Figs. 20 and 21, Fig. 23 is a detail section showing the mechanism for controlling the third end fold with the parts in one position, Fig. 24 is a similar view with the parts in another position, Fig. 25 is a detail section taken in the plane of the line F—F of Fig. 10, Fig. 26 is a plan view of the folded carton looking from one direction, Fig. 27 is a similar view looking from the opposite direction, Fig. 28 is an end view of the collapsed carton, Fig. 29 is a perspective view showing the carton opened, Fig. 30 is a detail perspective view of the carton showing the first fold, Fig. 31 is a similar view showing a second fold, Fig. 32 is a similar view showing a third fold, Fig. 33 is a view in perspective of the carton showing the fourth and final fold, and Figs. 34, 35 and 36 are detail views showing three steps in the opening up of the collapsed carton.

The carton operated upon by the machine comprises a body portion having four sides 1, 2, 3, 4, and four flaps 5, 6, 7, 8, at one end thereof, and four flaps 9, 10, 11, 12, at the other end thereof. Several coacting mechanisms are employed to successively act upon the cartons to first feed the cartons one by one to the machine in their collapsed condition; to operate upon each carton to open the same; to fold and seal the flaps at one end thereof; and to eject the carton with the flaps at the other end unfolded so that the carton will be ready for filling.

The mechanism for feeding the cartons into the machine in their collapsed condition, is constructed, arranged and operated as follows: A feed table 13 is surmounted by a chute 14, within which chute the collapsed cartons are piled. A suction pipe 15 leads from the surface of the table beneath the chute 14 to an exhaust pump 16.

A reciprocating feeder 17 is mounted upon the table 13 which feeder is provided with a plate 18 having a beveled front edge 19 for insuring the passage of the front edge of the carton onto the plate 18. This plate 18 is provided with grippers 20 arranged to grasp the front edge of the bottom carton between them and the plate 18. These grippers 20 are normally closed and are raised by means of spring pressed cams 21 carried by a cross bar 22, which cams enter slots 23 in the grippers 20 when the feeder 17 is at the limit of its forward movement. Springs 24 yieldingly hold the opening cams 21 at the limit of their rearward movement.

The rear edge of the bottom collapsed carton is engaged by the shoulders 25* in the free ends of dogs 25 carried by rocking arms 26 fixed to a cross shaft 27.

These dogs 25 serve, when the arms 26 are rocked forwardly, to move the bottom collapsed carton forwardly a sufficient distance to insert its front edge between the grippers 20 and plate 18 of the feeder, the cartons above the bottom carton being held against this slight forward movement by the stops 28 supported from the cross bar 22.

Springs 29 serve to normally hold the free ends of the dogs 25 raised.

The arms 26 are yieldingly held at the limit of their rearward movement by a spring 30 engaging the arm 31 fixed to the shaft 27.

A spring arm 32 engages through an adjusting device 33 an arm 34 one end of which is pivoted to an arm 35 loosely mounted on the cross shaft 27 and the other end of which is pivoted to a lever 36 hinged on a bracket 37 carried by the frame 38. The free end of the spring arm 32 also engages an abutment 39 on the lever 36.

A spring 40 tends to swing the arm 35 rearwardly.

The carton feeder 17 has a lost motion connection with the main reciprocating carriage to be hereinafter described, through rods 41, which rods have stops 42, 43, fixed thereto upon opposite sides of brackets 44 uprising from the said feeder 17. One of these rods 41 is provided with a lug 45 arranged in position to engage the arm 35 as the rods 41 are moved rearwardly for swinging the arms 26 and thereby the dogs 25 forwardly for shoving the bottom collapsed carton forwardly into engagement with the grippers 20 of the feeder.

Spring guides 46 lead rearwardly from the rear wall of the chute 14, between which guides and the top of the table the collapsed carton is pushed by the feeder 17 as the feeder is moved rearwardly.

We will now proceed to describe the mechanism for opening the collapsed carton by suction applied to the top and bottom sides of the same. A carriage 47 is fitted to reciprocate rearwardly and forwardly in guides 48 carried by the side frames 49 of the machine. This carriage is provided with the upper suction nozzle 50 arranged to engage the top side of the collapsed carton as it is fed from the stack 14 rearwardly by the feeder 17. This suction nozzle 50 is connected through a conduit 51 with the suction box 52 of the exhaust pump 16. This suction nozzle 50 has a rearward and forward movement in a right line while the portion of the conduit which connects the nozzle with the box 52 has a rocking movement.

The upper end of this rocking portion is pivoted at 51* to the nozzle 50 and the lower end of said portion has a limited sliding movement in the suction box 52.

The carriage 47 is moved rearwardly and forwardly in its guides by a rock lever 53 pivoted at 54 at the base of the machine, the upper end of which rock lever is connected to the said carriage 47 by a connecting rod 55.

The rocking movement of the lever 53 is controlled by a cam 56 fixed on a rotary cross shaft 57 driven from the main drive shaft 58 through the gearing 59, 60.

The bottom suction nozzle 61 has a diagonally sliding movement in the cover 62 of an exhaust chest 63 connected to the suction box 52 through the conduits 64.

The bottom suction nozzle 61 is connected to a slide 65 by a rod 66, which slide has fixed thereto a rearwardly extended rod 67, the rear end of which is fitted to slide in a bearing 67* on the machine frame. This rod 67 has a lost motion connection with a rod 53* extended forwardly from the rock lever 53 and having its front end provided with a collar 53 slidably mounted on the rod 67 between fixed stops 67, 67***, on the rod 67. This slide 65 has a limited rearward and forward movement in a right line in tracks 68 mounted on the cover 62 of the exhaust chest 63 and the said cover 62 has a limited sliding movement rearwardly and forwardly without interfering with the communication from the nozzle 61 to the suction box 52.

The sides of the bottom suction nozzle 61 are provided with studs or rollers 69 which are fitted to travel in the grooves 70 of stationary side cams 71, the shape of which grooves is such that the mouth of the bottom suction nozzle 61 is moved rearwardly and downwardly from the feed table 13 and forwardly and upwardly toward the said table, thereby moving the nozzle 61 away from and toward the nozzle 50 as the two nozzles are moved rearwardly and forwardly.

The front wall at the mouth of the upper suction nozzle 50 is provided with fixed stops 72 for engaging the front upper corner of the opened carton. The back wall at the mouth of the said upper suction nozzle 50 is provided with movable stops 73 controlled by fixed side cams 74, on the feed table 13. These cams 74 serve to hold the stops 73 raised out of their operative position until the suction nozzle 50 has been moved rearwardly a sufficient distance to bring the carton over the lower suction nozzle 61. These movable stops 73 are arranged to engage the back upper corner of the carton so that the carton is held in proper register by the nozzle 50. The side wall of the upper nozzle 50 is provided with a cam 75 which serves to operate a swinging latch 76 hinged at 77 to one of the fixed side cams 74, which latch has one end arranged to be engaged by the cam 75 for swinging the latch and another end arranged to engage the top flaps of the collapsed cartons and bend the same upwardly for insuring their separation from the bottom flaps as the cartons are moved rearwardly by the upper suction nozzle 50 into position to be engaged by the lower suction nozzle 61. A spring 76* serves to yieldingly hold the latch at the limit of its outward movement.

The mechanism for inserting the formers into the opened cartons and subjecting each carton to successive folding operations at one thereof and for conveying the cartons successively to a predetermined delivery point to eject them from the machine, is constructed, arranged and operated as follows: A series of formers 78, having heads corresponding in cross section to the cross sectional shape of the opened cartons and having pistons movable laterally of the machine in cylinders 79, are carried by an endless chain carrier comprising side chains 80 passing around sprocket wheels 81 at the front end of the machine and sprocket wheels 82 at the rear end of the machine. The shaft for the front sprocket wheels 81 is denoted by 83 and it is loosely mounted in suitable bearings in the machine frame. The shaft for the rear sprocket wheels 82 is denoted by 84 and it is driven at the desired speed from the shaft 57 through the train of gears 85, 86, 87, 88, 89 and 90.

The endless chain carrier is disposed horizontally of the machine and is offset laterally from the path of the cartons.

The formers 78 are forced laterally into the opened cartons while the cartons are still held by the upper and lower suction nozzles 50, 61. The formers are held in this position by mechanical means while the flaps at one end of the cartons are folded and secured together and finally ejected from the formers. The formers are then moved laterally back into the plane of the endless chain carrier in position to again complete the above cycle of operations.

The mechanisms employed for imparting the movements above described to the formers comprise the following coacting devices:

The motive fluid under pressure is fed from a source of supply not shown through a pipe 91, valve 92 and nozzle 92* of well known or approved form, to the interior of the cylinder 79 when the cylinder comes into alinement therewith. This valve 92 is normally held closed by means of a weighted arm 93. The valve 92 is opened at the proper time to force the former 78 laterally into the opened carton when the carton is brought into alinement with the former and the cylinder into alinement with the nozzle by a cam 94 on the carriage 47. This cam 94 engages an arm 95 fixed to a rock shaft 96 mounted in suitable bearings 97 on the machine frame. This shaft 96 has fixed thereto another arm 98 connected to one arm of a rock lever 99 pivoted at 100 to a bracket 101 on the frame, the other arm of which lever 99 is connected to the weighted arm 93 above referred to.

As the former 78 is forced into the opened carton, its movement is stopped by a yielding bumper 102 mounted on the first folder cam 103 which has already folded the side flap 7. The bumper 102 is so placed on the cam folder 103 that it will be struck by the inner advance edge of the former 78.

Immediately after the first flap 7 has been folded, the second flap 6 is partly folded by the outer end of a horizontally rocking folder arm 104 fixed to a rock shaft 105 mounted in a bracket 106 on the main frame, which shaft 105 has fixed thereto a tripping arm 107 arranged to be moved rearwardly by the stop 108 and forwardly by the stop 109 on the carriage 47.

A spring 110 is so connected to the rock shaft 105 that it will automatically hold the arms 104, 107, at the limit of their movement in both directions.

A cam plate 111 is arranged to enter a recess 112 in the former 78 as the former is moved rearwardly with its carton by the endless chain carrier. The rear end of this cam plate 111 is pressed laterally by a spring 113 for holding the former under spring pressure at the limit of its outward movement against the end flaps of the carton. This cam plate 111 holds the former in this position until the stationary guide 114 enters the recess 112. This guide 114 retains the former in its position until the former is brought under the control of the extra pressure devices to be hereinafter described.

Immediately after the second fold, viz; the folding of the flap 6, the third flap 8 is folded upwardly by the following mechanism:

A folder plate 115 is hinged to swing vertically at 116 to the machine frame at one point, which plate has a link connection 117 with the free end of a transverse arm 118 hinged at 119 to the frame at another point. A guide 120 is provided for the transverse arm 118.

A longitudinally extended lever is pivoted at 121 to a bracket 122 fixed to the frame, the front arm 123 of which lever is engaged with the rock arm 118 and the other arm 124 of which lever is arranged to be engaged by the preceding former.

It will thus be seen that the movement of the folder plate 115 for one carton is controlled by the former for the preceding carton.

The folder plate 115 is returned to its inoperative position by gravity.

An adhesive is applied to the under side of the upper end flap 5 after the other three flaps have been folded by the following mechanism:

An adhesive containing pot 125, of any well known or approved construction, is adjustably mounted on the machine frame. An adhesive applying wheel 126 is fixed to a shaft 127 mounted on suitable bearings in a bracket 128 carried by the main frame, which wheel is located in position to engage the adhesive in the pot 125. This wheel is driven from any suitable source of power. In the present instance, I have shown the shaft 127 as driven from a shaft 129 through a chain and sprocket connection 130, 131, 132, the shaft 129 having a pulley 133 driven from any suitable source of power not shown herein.

The excess adhesive is removed from the wheel by a scraper 134. The under face of the end flap 5 is held against the periphery of the wheel 126 as the flap passes over the same by a pressure plate 135.

The mechanism for performing the last fold by folding down the gummed end flap 5 is constructed, arranged and operated as follows: A reciprocating folder blade 136 is attached to a slide plate 137 which is fitted to slide in guides 138, 139, mounted on the frame. This blade 136 is held in its raised position by means of a spring 140 attached at one end to the slide plate 137 and at its other end to a bracket 141 uprising from the main frame.

A bell crank lever is pivoted at 142 to the main frame and one of its arms 143 is provided with a pin and slot connection 144, 145, with the slide plate 137. The other arm 146 of said lever is provided with a stud or roller 147 which is arranged in position to be engaged by a cam 148 on the carriage 47 as the carriage approaches the limit of its rearward movement. This cam 148 will rock the bell crank lever in a direction to move the tucker blade 136 downwardly to fold the flap 5 over the other flaps at the end of the carton.

A longitudinally arranged bar 149 is arranged in position to hold the end flaps in their folded arrangement while the cartons are being moved rearwardly to the extra pressure mechanism, the construction of which will now be described.

A wheel 150 is fixed to the shaft 84, which wheel is provided with a series of seats having end walls 151. These seats are spaced apart a distance equal to the distance between successive formers on the endless chain carrier. After the formers 78 have been released from their guide 114 means are employed for forcing the formers endwise against the end walls 151 of the seats for squeezing the folded end flaps tightly together for insuring a permanent sealing of the same. This means includes a face cam 153 fixed to the main frame around the shaft 84, against which cam engages studs or rollers 154 carried by laterally sliding bars 155. Radially arranged rocking levers are pivoted at 156 to the wheel 150, the inner arms 157 of which are connected to the laterally sliding bars 155 and the outer arms 158 of which are provided with hooks 159 arranged to engage the inner ends of the heads of the formers 78.

When the studs or rollers 154 pass over the high part of the cam 153, the folded end flaps of the carton will be pressed closely against the end walls 151 of the seats on the wheel 150 and when the said studs or rollers pass along the low portion of said cam, the endwise pressure will be removed from said cartons.

A horizontally arranged belt 160 is arranged in position to hold the cartons on their formers as the cartons are moved toward the front of the machine after leaving the pressure wheel 150, which belt passes around vertically arranged pulleys 161, 162.

The pulley 161 is fast upon a vertical shaft 163, which shaft has a gearing connection 164, 165, with a cross shaft 166, which cross shaft is driven from the shaft 57 by the belt and pulley connection 167, 168, 169.

Means for blowing the cartons successively from their formers as they reach a delivery point near the forward end of the machine comprises a nozzle 170 communicating through a pipe 171 with a source of motive fluid pressure supply, not shown herein.

A valve 172 is arranged to be opened at the proper time to blow a carton from its former, which opening means is controlled by the next succeeding former, as follows:

A rock lever is pivoted at 173 to a bracket 174 on the main frame, the lower arm 175 of which bracket depends into the path of the formers. The upper arm 176 of the lever is connected to the valve by the rod 177. A spring 178 serves to normally hold the valve in its closed position and a stop 179 is provided for limiting the movement of the said rock lever. After the carton has been blown from the former, the former is blown back to its original position as the outer end of the former passes across the mouth of the nozzle 180, which nozzle is connected to a source of motive fluid pressure supply not shown herein, through the pipe 181.

The valve for the nozzle 180 is denoted by 182 and it is held normally closed by gravity. This valve is opened by the following mechanism:

A rock lever is pivoted at 183 to a bracket 184 on the main frame, one arm 185 of which lever is connected by a rod 186 with the arm 187 of the valve 182, the other arm 188 of which lever is arranged in position to be engaged by the stop 108 on the carriage 47 as the carriage approaches the limit of its forward movement. To insure the formers being forced to the limit of their inward movement, the machine is provided with a cam 189, which cam is arranged in position to engage the outer ends of the formers as they pass around the front chain wheel 81.

The specific shape and construction of the former are as follows:

The head of the former comprises a rectangular shaped outer end 190, from which end the piston 191 which slides in the cylinder 79, projects. Oppositely arranged flat wings 192, 193, project inwardly from the end 190, which wings are spaced sufficiently from the piston 191 to permit them to overlap the cylinder 79 when the former is at the limit of its inward movement. The former is prevented from rotating by providing it with a tongue and groove connection 194, 195, with the cylinder 79.

To prevent any tendency on the part of the carton to be torn as it is removed from the upper and lower suction nozzles 50, 61, by the former, the mouth of the suction nozzle 61 is provided with a sliding member 196, which member will have a limited sliding movement with the carton sufficiently to release the bottom of the carton from the suction effect of the nozzle 61. A spring 197 serves to yieldingly hold the sliding member 196 in its proper position. A stop 198 is provided for limiting the forward movement of said member.

The mouths of the suction nozzles 50, 61, may be provided respectively with gratings 199, 200.

A guide 201 is provided for the bottom of the carton as it passes from the bar 149 to its seat on the wheel 150. A roller 202 is mounted on a suitable bracket 203 carried by one of the side frames 49, which roller is arranged in position to squeeze the outer end of the carton between it and the guide 201 as the carton passes from the bar 149 to its seat on the wheel 150. This prevents any bulging of the carton at the folded end thereof.

Proceeding to describe the operation of the machine, the parts are assumed to be in the position which they assume when the carriage 47 is at the limit of its forward movement. The operation of the machine will be described with respect to one carton, it being understood that the cycle of operations is repeated for each successive carton.

The folded cartons are disposed horizontally in a vertical pile within the chute 14. The rear edge of the bottom carton will rest upon the dogs 25 against the shoulders 25*, the dogs being at the limit of their rearward movement. As the carriage 47 starts rearwardly, the rods 41 which connect the carriage with the feeder 17 on the feed table 13, will also move rearwardly and the lug 45 on one of the rods 41 will engage the arm 35 and move the arms 26 and thereby the dogs 25 forwardly. The dogs will shove the bottom carton forwardly until its front edge is located between the grippers 20 and the plate 18 of the feeder. The spring pressed cams 21 are in position to hold the grippers open to receive the carton.

The beveled rear edge 19 of the plate 18 will snugly press against the feed table 13 and thus insure the free passage of the carton onto the plate without any liability of the carton becoming caught and wedged in front of the said plate.

As the lug 45 on one of the rods 41 passes rearwardly out of engagement with its arm 35, the dogs 25 will be withdrawn from under the rear edge of the bottom carton and will be automatically returned to their normal position to receive thereon the rear edge of the next succeeding carton. The free ends of the dogs 25 are held raised a sufficient distance above the feed table to permit the bottom carton to be fed rearwardly along the table beneath said dogs. The further rearward movement of the carriage 47 will cause the stops 42 on the rods 41 to engage the brackets 44 uprising from the feeder 17 and thereby start the feeder on its rearward movement.

As the feeder starts on its rearward movement the cams 21 will be withdrawn through the slots 23 from their engagement with the grippers 20 and will thus permit the grippers to close upon the front edge of the bottom carton.

In the meantime, the suction is applied to the bottom of the carton to draw it snugly down onto the feed table to insure its proper passage along the same from beneath the other cartons.

The further rearward movement of the carriage 47 will cause the feeder plate 18 to push the bottom carton rearwardly to a point on the table just beyond the free ends of the spring guides 46.

As the carriage is moved forwardly, the stops 42 on the rods 41 will engage the brackets 44 of the feeder 17 and thus return the feeder to the limit of its forward movement. As the feeder starts on its forward movement, the free ends of the spring guides 46 will engage the front edge of the fed in carton and strip it from the grippers 20 and thus retain the carton in position to be brought under the control of the upper suction nozzle 50 at the proper time, as will hereinafter appear.

As the feeder 17 nears the limit of its forward movement, the spring pressed cams 21 will enter the slots 23 and again open the grippers 20 ready to receive the next succeeding collapsed carton.

As the carriage 47 moves forwardly, it will bring the mouth of the upper suction nozzle 50 to a point directly over the side 1 of the collapsed carton, as clearly shown in Fig. 34.

As the carriage 47 starts on its rearward movement, the collapsed carton is moved rearwardly by the nozzle 50, the front fixed stops 72 overlapping the front edge of the carton and insuring its proper position with respect to the suction nozzle.

The lost motion connection between the rock lever 53 and the lower suction nozzle 61, permits the upper suction nozzle to be moved by its connection with the rock lever 53 to a point which will bring the side 4 of the collapsed carton into engagement with the mouth of the lower suction nozzle.

The further rearward movement of the rock lever 53 and thereby the carriage 47, will cause the lower suction nozzle 61 to move rearwardly and downwardly away from the upper suction nozzle 50 and at the proper speed with respect to the speed of the upper suction nozzle 50 to open up the carton into rectangular form. It will be seen that this is accomplished without the use of any opening devices other than the suction effect upon the top and bottom sides of the carton by the upper and lower suction nozzles.

As the movable stops on the upper suction nozzle 50 pass rearwardly beyond the fixed cams 74, on the feed table 13, the movable stops will drop by gravity down into position to engage the rear upper corner of the open carton and thus hold the carton between them and the fixed front stops 72 in proper position with respect to the upper suction nozzle.

As the upper suction nozzle 50 passes off the feed table 13, its cam 75 will rock the nose of the swinging latch 76 into position to separate the top flap 5 from the bottom flap 8 as the folded carton passes rearwardly into its position to be opened by the suction nozzles 50, 61. This will insure the proper opening of the carton even should these flaps be stuck together. This rocking latch 76 also gives an upward set to the top flap 5 to facilitate the insertion of its former 78.

As the upper and lower suction nozzles 56, 61, with their opened carton near the limit of their rearward movement, the opened carton is brought into alinement with its former, and, at the same time, the valve 92 is opened to admit the pressure fluid to the cylinder 79 to force the former 78 laterally into the opened carton. This valve 92 is opened by the cam 94 on the carriage 47 as has heretofore been described.

In the meantime, the first folder cam 103 has folded the side flap 7. As the former 78 is forced into the opened carton, its outward movement is stopped by the yielding bumper 102 on the first folder cam 103. Immediately after the side flap has been folded by the cam 103 and as the former is being forced into the open cartons, the side flap 6 is partly folded by the swinging movement of the rocking folder arm 104, which movement of the arm 104 is produced by the stop 108 on the carriage 47 as has heretofore been described.

This rocking folder arm 104 folds the flap 6 a sufficient distance to permit the cam 103 to complete the folding movement of the said flap as the carton is moved rearwardly by the former 78. It will be understood that the folder arm 104 is returned to its opened position by the stop 109 as the carriage 47 returns to the limit of its forward movement.

As the carton continues its rearward movement, the third folder plate 115 is operated by the preceding former with its carton thereon, to fold the flap 8 upwardly.

The still further rearward movement of the carton and its former will draw the top end flap 5 across the periphery of the glue wheel 126. The carton will then be moved rearwardly in position to have its flap 5 folded downwardly by the folder blade 136, which folder blade is operated by the cam 148 on the carriage 47 as has hereinbefore been fully explained. These folded end flaps are then held in their folded position by the bar 149 as will hereinafter appear.

As the cylinder 79 of the former 78 leaves the nozzle of the pressure fluid pipe 91, the recess 122 in the former 78 is brought into engagement with the front end of the spring cam plate 111, which plate assumes control of the former 78 and holds it yieldingly pressed at the limit of its outward movement until the recess 112 is engaged by the forward end of the stationary guide 114. This guide 114 holds the carton pressed against the bar 149 and this guide retains the former in this position until the former is brought under the control of the means for exerting extra pressure for insuring the proper sealing of the end flaps.

As the former passes from the top rectilinear portion of its path to the circular portion of its path around the wheel 150 at the rear end of the machine, the folded end of the carton is brought into one of the seats on the said wheel with its folded end pressed against the end wall 151 of said seat. Extra endwise pressure is applied to the former for pressing the folded end snugly against the end wall 151 by the device already hereinabove described, including the stationary cam 153 and the mechanism controlled thereby for drawing the hooks 159 against the inner end of the head of the former. As the former and its carton leave the circular portion of their path and enter the rectilinear portion of their path at the rear end of the machine, the folded end of the carton is brought into engagement with the endless traveling belt 160 for holding the carton in position on the former as it passes forwardly to the point of delivery.

As the former and its carton leave the forward end of the endless belt 160, they pass in front of the blast nozzle 170, the blast from which nozzle blows the carton off from the former. The valve 172 for controlling the nozzle 170 is controlled by a succeeding former and carton.

As the former passes forwardly from the bottom rectilinear portion of its path into the circular portion of its path at the forward end of the machine, it passes across the blast nozzle 180 where the former is blown back into its cylinder 79.

The valve 182 for this nozzle 180 is opened by the stop 108 on the carriage 47 as the carriage approaches the limit of its forward movement. It will thus be seen that this valve is opened.

If the former has not been forced entirely into its cylinder, it will be engaged by the cam 189 and forced to the limit of its inward movement within the cylinder. The cycle of operations is then completed.

It is evident that changes might be resorted to in the form, construction and arrangement of the several parts without departing from the spirit and scope of our invention; hence we do not wish to limit ourselves strictly to the structure herein set forth, but

What we claim is:—

1. In a machine of the character described, means for feeding in a collapsed carton and suction means for fully opening up the carton and holding the carton open for a subsequent operation.

2. In a machine of the character described, means for feeding in a collapsed carton and suction means applied to the opposite sides of the carton for fully opening up the same and holding it open for a subsequent operation.

3. In a machine of the character described, means for feeding in a collapsed carton and suction means applied to the upper and lower sides of the carton for fully opening up the same and holding it open for a subsequent operation.

4. In a machine of the character described, means for feeding in a collapsed carton, suction means for fully opening up the carton and holding it open for a subsequent operation and mechanisms operating to fold and seal the flaps at one end of the carton.

5. In a machine of the character described, means for feeding in a collapsed carton, means for opening up the carton, a former traveling in an endless path and fluid pressure means for forcing the former into the opened carton at a predetermined point in its travel.

6. In a machine of the character described, means for feeding in a collapsed carton, means for opening up the carton, a former traveling in an endless path, fluid pressure means for forcing the former into the opened carton at a predetermined point in its travel and mechanisms operating to fold and seal the flaps at one end of the carton.

7. In a machine of the character described, means for feeding in a collapsed carton, suction means for fully opening up the carton, a former and means for forcing the former into the carton while it is held open by the suction means.

8. In a machine of the character described, means for feeding in a collapsed carton, suction means for fully opening up the carton, a former, means for forcing the former into the carton while it is held open by the suction means and mechanisms operating to fold and seal the flaps at one end of the carton.

9. In a machine of the character described, means for feeding in a collapsed carton, suction means for fully opening up the carton, a traveling former and means for forcing the former into the carton while it is held open by the suction means at a predetermined point in the travel of the former.

10. In a machine of the character described, means for feeding in a collapsed carton, suction means for fully opening up the carton, a traveling former, means for forcing the former into the carton while it is held open by the suction means at a predetermined point in the travel of the former and mechanisms operating to fold and seal the flaps at one end of the carton.

11. In a machine of the character described, means for feeding in a collapsed carton, suction means for fully opening up the carton, a former traveling in an endless path and means for forcing the former into the carton while it is held open by the suction means at a predetermined point in the travel of the former.

12. In a machine of the character described, means for feeding in a collapsed carton, suction means for fully opening up the carton, a former traveling in an endless path, means for forcing the former into the carton while it is held open by the suction means at a predetermined point in the travel of the former, and mechanisms operating to fold and seal the flaps at one end of the carton.

13. In a machine of the character described, means for feeding in a collapsed carton, suction means for opening up the carton, a former traveling in an endless path and fluid pressure means for forcing the former into the opened carton at a predetermined point in its travel.

14. In a machine of the character described, means for feeding in a collapsed carton, suction means for opening up the carton, a former traveling in an endless path, fluid pressure means for forcing the former into the opened carton at a predetermined point in its travel, and mechanisms operating to fold and seal the flaps at one end of the carton.

15. In a machine of the character described, means for feeding in a collapsed carton, means for opening up the carton, a former, means for forcing the former into the opened carton, mechanisms operating to fold and seal the flaps at one end of the carton and fluid pressure means for blowing the carton off the former.

16. In a machine of the character described, means for feeding in a collapsed carton, means for opening up the carton, a traveling former, means for forcing the former into the opened carton at one point in its travel, mechanisms operating to fold and seal the flaps at one end of the carton and fluid pressure means for blowing the carton off the former at another point in its travel.

17. In a machine of the character described, means for feeding in a collapsed carton, means for opening up the carton, a former traveling in an endless path, means for forcing the former into the opened carton at one point in its travel, mechanisms operating to fold and seal the flaps at one end of the carton and fluid pressure means for blowing the carton off the former at another point in its travel.

18. In a machine of the character described, means for feeding in a collapsed carton, means for opening up the carton, a former, fluid pressure means for forcing the former into the opened carton, mechanisms operating to fold and seal the flaps at one end of the carton and fluid pressure means for blowing the carton off the former.

19. In a machine of the character described, means for feeding in a collapsed carton, means for opening up the carton, a traveling former, fluid pressure means for forcing the former into the opened carton at one point in its travel, mechanisms operating to fold and seal the flaps at one end of the carton and fluid pressure means for blowing the carton off the former at another point in its travel.

20. In a machine of the character described, means for feeding in a collapsed carton, means for opening up the carton, a former traveling in an endless path, fluid pressure means for forcing the former into the opened carton at one point in its travel, mechanisms to fold and seal the flap at one end of the carton and fluid pressure means for blowing the carton off the former at another point in its travel.

21. In a machine of the character described, means for feeding in a collapsed carton, suction means for opening up the carton, a former, means for forcing the former into the opened carton, mechanisms operating to fold and seal the flaps at one end of the carton and fluid pressure means for blowing the carton off the former.

22. In a machine of the character described, means for feeding in a collapsed carton, suction means for opening up the carton, a traveling former, means for forcing the former into the opened carton at one point in its travel, mechanisms operating to fold and seal the flaps at one end of the carton and fluid pressure means for blowing the carton off the former at another point in its travel.

23. In a machine of the character described, means for feeding in a collapsed carton, suction means for opening up the carton, a former traveling in an endless path, means for forcing the former into the opened carton at one point in its travel, mechanisms operating to fold the flaps at one end of the carton and fluid pressure means for blowing the carton off the former at another point in its travel.

24. In a machine of the character described, means for feeding in a collapsed carton, suction means for opening up the carton, a former, fluid pressure means for forcing the former into the opened carton, mechanisms operating to fold and seal the flaps at one end of the carton and fluid pressure means for blowing the carton off the former.

25. In a machine of the character described, means for feeding in a collapsed carton, suction means for opening up the carton, a traveling former, fluid pressure means for forcing the former into the opened carton at one point in its travel, mechanisms operating to fold and seal the flaps at one end of the carton and fluid pressure means for blowing the carton off the former at another point in its travel.

26. In a machine of the character described, means for feeding in a collapsed carton, suction means for opening up the carton, a former traveling in an endless path, fluid pressure means for forcing the former into the opened carton at one point in its travel, mechanisms operating to fold and seal the flaps at one end of the carton and fluid pressure means for blowing the carton off the former at another point in its travel.

27. In a machine of the character described, means for feeding in a collapsed carton, means for opening up the carton, a former, means for forcing the former forward into the opened carton, mechanisms operating to fold and seal the flaps at one end of the carton, fluid pressure means for blowing the carton off the former, and means for forcing the former back.

28. In a machine of the character described, means for feeding in a collapsed carton, means for opening up the carton, a former, means for forcing the former forward into the opened carton, mechanisms operating to fold and seal the flaps at one end of the carton, fluid pressure means for blowing the carton off the former, and fluid pressure means for forcing the former back.

29. In a machine of the character described, means for feeding in a collapsed carton, means for opening up the carton, a traveling former, means for forcing the former forward into the opened carton at one point in its travel, mechanisms operating to fold and seal the flaps at one end of the carton, fluid pressure means for blowing the carton off the former at another point in its travel, and means for forcing the former back at still another point in its travel.

30. In a machine of the character described, means for feeding in a collapsed carton, means for opening up the carton, a traveling former, means for forcing the former forward into the opened carton at one point in its travel, mechanisms operating to fold and seal the flaps at one end of the carton, fluid pressure means for blowing the carton off the former at another point in its travel, and fluid pressure means for forcing the former back at still another point in its travel.

31. In a machine of the character described, means for feeding in a collapsed carton, means for opening up the carton, a former traveling in an endless path, means for forcing the former forward into the opened carton at one point in its travel, mechanisms operating to fold and seal the flaps at one end of the carton, fluid pressure means for blowing the carton off the former at another point in its travel, and means for forcing the former back at still another point in its travel.

32. In a machine of the character described, means for feeding in a collapsed carton, means for opening up the carton, a former traveling in an endless path, means for forcing the former forward into the opened carton at one point in its travel, mechanisms operating to fold and seal the flaps at one end of the carton, fluid pressure means for blowing the carton off the former at another point in its travel, and fluid pressure means for forcing the former back at still another point in its travel.

33. In a machine of the character described, means for feeding in a collapsed carton, means for opening up the carton, a former, fluid pressure means for forcing the former forward into the opened carton, mechanisms operating to fold and seal the flaps at one end of the carton, fluid pressure means for blowing the carton off the former, and means for forcing the former back.

34. In a machine of the character described, means for feeding in a collapsed carton, means for opening up the carton, a former, fluid pressure means for forcing the former forward into the opened carton, mechanisms operating to fold and seal the flaps at one end of the carton, fluid pressure means for blowing the carton off the former at another point in its travel, and fluid pressure means for forcing the former back.

35. In a machine of the character described, means for feeding in a collapsed carton, means for opening up the carton, a traveling former, fluid pressure means for forcing the former forward into the opened carton at one point in its travel, mechanisms operating to fold and seal the flaps at one end of the carton and fluid pressure means for blowing the carton off the former at another point in its travel, and means for forcing the former back at still another point in its travel.

36. In a machine of the character described, means for feeding in a collapsed carton, means for opening up the carton, a traveling former, fluid pressure means for forcing the former forward into the opened carton at one point in its travel, mechanisms operating to fold and seal the flaps at one end of the carton, fluid pressure means for blowing the carton off the former at another point in its travel, and fluid pressure means for forcing the former back at still another point in its travel.

37. In a machine of the character described, means for feeding in a collapsed carton, means for opening up the carton, a former traveling in an endless path, fluid pressure means for forcing the former forward into the opened carton at one point in its travel, mechanisms to fold and seal the flap at one end of the carton, fluid pressure means for blowing the carton off the former at another point in its travel, and means for forcing the former back at still another point in its travel.

38. In a machine of the character described, means for feeding in a collapsed carton, means for opening up the carton, a former traveling in an endless path, fluid pressure means for forcing the former forward into the opened carton at one point in its travel, mechanisms to fold and seal the flap at one end of the carton, fluid pressure means for blowing the carton off the former at another point in its travel, and fluid pressure means for forcing the former back at still another point in its travel.

39. In a machine of the character described, means for feeding in a collapsed carton, suction means for opening up the carton, a former, means for forcing the former forward into the opened carton, mechanisms operating to fold and seal the flaps at one end of the carton, fluid pressure means for blowing the carton off the former, and means for forcing the former back.

40. In a machine of the character described, means for feeding in a collapsed carton, suction means for opening up the carton, a former, means for forcing the former forward into the opened carton, mechanisms operating to fold and seal the flaps at one end of the carton, fluid pressure means for blowing the carton off the former, and fluid pressure means for forcing the former back.

41. In a machine of the character described, means for feeding in a collapsed carton, suction means for opening up the carton, a traveling former, means for forcing the former forward into the opened carton at one point in its travel, mechanisms operating to fold and seal the flaps at one end of the carton, fluid pressure means for blowing the carton off the former at another point in its travel, and means for forcing the former back at still another point in its travel.

42. In a machine of the character described, means for feeding in a collapsed carton, suction means for opening up the carton, a traveling former, means for forcing the former forward into the opened carton at one point in its travel, mechanisms operating to fold and seal the flaps at one end of the carton, fluid pressure means for blowing the carton off the former at another point in its travel, and fluid pressure means for forcing the former back at still another point in its travel.

43. In a machine of the character described, means for feeding in a collapsed carton, suction means for opening up the carton, a former traveling in an endless path, means for forcing the former forward into the opened carton at one point in its travel, mechanisms operating to fold the flaps at one end of the carton, fluid pressure means for blowing the carton off the former at another point in its travel, and means for forcing the former back at still another point in its travel.

44. In a machine of the character described, means for feeding in a collapsed carton, suction means for opening up the carton, a former traveling in an endless path, means for forcing the former forward into the opened carton at one point in its travel, mechanisms operating to fold the flaps at one end of the carton, fluid pressure means for blowing the carton off the former at another point in its travel, and fluid pressure means for forcing the former back at still another point in its travel.

45. In a machine of the character described, means for feeding in a collapsed carton, suction means for opening up the carton, a former, fluid pressure means for forcing the former forward into the opened carton, mechanisms operating to fold and seal the flaps at one end of the carton, fluid pressure means for blowing the carton off the former, and means for forcing the former back.

46. In a machine of the character described, means for feeding in a collapsed carton, suction means for opening up the carton, a former, fluid pressure means for forcing the former forward into the opened carton, mechanism operating to fold and seal the flaps at one end of the carton, fluid pressure means for blowing the carton off the former, and fluid pressure means for forcing the former back.

47. In a machine of the character described, means for feeding in a collapsed carton, suction means for opening up the carton, a traveling former, fluid pressure means for forcing the former forward into the opened carton at one point in its travel, mechanisms operating to fold and seal the flaps at one end of the carton and fluid pressure means for blowing the carton off the former at another point in its travel, and means for forcing the former back at still another point in its travel.

48. In a machine of the character described, means for feeding in a collapsed carton, suction means for opening up the carton, a traveling former, fluid pressure means for forcing the former forward into the opened carton at one point in its travel, mechanisms operating to fold and seal the flaps at one end of the carton, fluid pressure means for blowing the carton off the former at another point in its travel, and fluid pressure means for forcing the former back at still another point in its travel.

49. In a machine of the character described, means for feeding in a collapsed carton, suction means for opening up the carton, a former traveling in an endless path, fluid pressure means for forcing the former forward into the opened carton at one point in its travel, mechanisms operating to fold and seal the flaps at one end of the carton, fluid pressure means for blowing the carton off the former at another point in its travel, and means for forcing the former back at still another point in its travel.

50. In a machine of the character described, means for feeding in a collapsed carton, suction means for opening up the carton, a former traveling in an endless path, fluid pressure means for forcing the former forward into the opened carton at one point in its travel, mechanisms operating to fold and seal the flaps at one end of the carton, fluid pressure means for blowing the carton off the former at another point in its travel, and fluid pressure means for forcing the former back at still another point in its travel.

51. In a machine of the character described, means for feeding in a collapsed carton, means for opening up the carton, a former, means for forcing the former forward into the opened carton, mechanisms operating to fold the flaps against the former at one end of the carton and seal said flaps, means for exerting extra pressure on said folded flaps and means for ejecting the carton and returning the former.

52. In a machine of the character described, means for feeding in a collapsed carton, means for opening up the carton, a traveling former, means for forcing the former forward into the opened carton, mechansims operating to fold the flaps against the former at one end of the carton and seal said flaps, means for exerting extra pressure on said folded flaps and means for ejecting the carton and returning the former.

53. In a machine of the character described, means for feeding in a collapsed carton, means for opening up the carton, a former traveling in an endless path, means for forcing the former forward into the opened carton, mechanisms operating to fold the flaps against the former at one end of the carton and seal said flaps, means for exerting extra pressure on said folded flaps and means for ejecting the carton and returning the former.

54. In a machine of the character described, means for feeding in a collapsed carton, an endless carrier traveling in a path offset from the path of the carton, a former mounted on the said carrier, means for opening up a carton and bringing it into alinement with the former, means for forcing the former forward into the opened carton and mechanisms operating to fold and seal the flaps at one end of the carton, eject the carton and return the former.

55. In a machine of the character described, means for feeding in a collapsed carton, an endless carrier traveling in a path offset from the path of the carton, a former mounted on said carrier, suction means for opening up the carton and bringing it into alinement with the former, means for forcing the former forward into the opened carton and mechanisms operating to fold and seal the flaps at one end of the carton, eject the carton and return the former.

56. In a machine of the character described, means for feeding in a collapsed carton, an endless carrier traveling in a path offset from the path of the carton, a former mounted on said carrier, means for opening up the carton and bringing it into alinement with the former, fluid pressure means for forcing the former forward into the opened carton and mechanisms operating to fold and seal the flaps at one end of the carton, eject the carton and return the former.

57. In a machine of the character described, means for feeding in a collapsed carton, an endless carrier traveling in a path offset from the path of the carton, a former mounted on said carrier, suction means for opening up the carton and bringing it into alinement with the former, fluid pressure means for forcing the former forward into the opened carton and mechanisms operating to fold and seal the flaps at one end of the carton, eject the carton and return the former.

58. In a machine of the character described, means for feeding in a collapsed carton, an endless carrier traveling in a path offset from the path of the carton, a former mounted on said carrier, means for opening up the carton and bringing it into alinement with the former, means for forcing the former forward into the opened carton and mechanisms operating to fold and seal the flaps at one end of the carton, exert extra pressure on said folded flaps, eject the carton and return the former.

59. In a machine of the character described, means for feeding in a collapsed carton, an endless carrier traveling in a path offset from the path of the carton, a former mounted on said carrier, suction means for opening up the carton and bringing it into alinement with the former, means for forcing the former forward into the opened carton and mechanisms operating to fold and seal the flaps at one end of the carton, exert extra pressure on said folded flaps, eject the carton and return the former.

60. In a machine of the character described, means for feeding in a collapsed carton, an endless carrier traveling in a path offset from the path of the carton, a former mounted on said carrier, means for opening up the carton and bringing it into alinement with the former, fluid pressure means for forcing the former forward into the opened carton and mechanisms operating to fold and seal the flaps at one end of the carton, exert extra pressure on said folded flaps, eject the carton and return the former.

61. In a machine of the character described, means for feeding in a collapsed carton, an endless carrier traveling in a path offset from the path of the carton, a former mounted on said carrier, suction means for opening up the carton and bringing it into alinement with the former, fluid pressure means for forcing the former forward into the opened carton and mechanisms operating to fold and seal the flaps at one end of the carton, exert extra pressure on said folded flaps, eject the carton and return the former.

62. In a machine of the character described, a reciprocating carriage, a suction nozzle carried thereby, a support for a pile of collapsed cartons and means controlled by the movement of the reciprocating carriage for feeding a collapsed carton into position to be engaged by said suction nozzle.

63. In a machine of the character described, a reciprocating carriage, a suction nozzle carried thereby, a support for a pile of collapsed cartons, a feed table and means controlled by the movement of the carriage for feeding in a carton to a point on the table where it may be engaged by said suction nozzle.

64. In a machine of the character described, a reciprocating carriage, a suction nozzle carried thereby, a support for a pile of collapsed cartons, a feed table and a feeder having a lost motion connection with the carriage for feeding in a carton to a point on the table where it may be engaged by said suction nozzle.

65. In a machine of the character described, means for feeding in a collapsed carton and two suction nozzles operable to engage opposite sides of the collapsed carton, fully open up the same and hold it open for a subsequent operation.

66. In a machine of the character described, means for feeding in a collapsed carton, a traveling former, two suction nozzles operable to engage opposite sides of the collapsed carton, open up the same and convey it to a point in alinement with the former and means for forcing the former into the opened carton.

67. In a machine of the character described, means for feeding in a collapsed carton and two reciprocating suction nozzles operable to engage the opposite sides of the collapsed carton and open up the same, one of said nozzles being movable outwardly and inwardly in a right line and the other of said nozzles being movable outwardly and inwardly in a straight line toward and away from the first-named suction nozzle.

68. In a machine of the character described, a feed table, means for feeding in a collapsed carton along the same, an upper reciprocating suction nozzle movable outwardly to a position over the feed table for engaging one side of the collapsed carton and a lower reciprocating suction nozzle movable forwardly into proximity with the table for engagng the opposite side of the carton, said suction nozzles being arranged to separate as they are moved inwardly to open up the carton.

69. In a machine of the character described, a feed table, means for feeding in a collapsed carton along the same, an upper reciprocating suction nozzle movable outwardly to a position over the feed table for engaging one side of the collapsed carton, a lower reciprocating suction nozzle movable forwardly into proximity with the table for engaging the opposite side of the carton, said suction nozzles being arranged to separate as they are moved inwardly to open up the carton, and means for positioning the carton with respect to said nozzles.

70. In a machine of the character described, a feed table, means for feeding in a collapsed carton along the same, an upper reciprocating suction nozzle movable outwardly to a position over the feed table, for engaging one side of the collapsed carton, a lower reciprocating suction nozzle movable forwardly into proximity with the table for engaging the opposite side of the carton, said suction nozzles being arranged to separate as they are moved inwardly to open up the carton and means for positioning said carton with respect to the said nozzle comprising stops for engaging the front and rear upper corners of the opened carton.

71. In a machine of the character described, a traveling carton carrying former and mechanisms for folding the flaps at one end of the carton comprising a stationary device for folding the first flap, a horizontally swinging device for folding the second flap, a vertically swinging device for folding the third flap and a reciprocating device for folding the fourth flap.

72. In a machine of the character described, a traveling endless carrier, a plurality of carton carrying formers, mounted thereon, carton feeding-in means including a reciprocating carriage and mechanisms operable to fold and seal the flaps at one end of each carton comprising a stationary device for folding the first flap, a movable device controlled by the carriage for folding the second flap, a movable device controlled by a preceding former for folding the third flap and a movable device controlled by the carriage for folding the fourth flap.

73. In a machine of the character described, a traveling endless carrier, a plurality of carton carrying formers mounted thereon, carton feeding-in means including a reciprocating carriage and mechanisms operable to fold and seal the flaps at one end of each of the cartons comprising a stationary device for folding the first flap, a horizontally swinging device controlled by the carriage for folding the second flap, a vertically swinging device controlled by a preceding former for folding a third flap and a removable device controlled by the carriage for folding the fourth flap.

74. In a machine of the character described, means for feeding in a collapsed carton, means for opening up the carton, a traveling former, fluid pressure means for forcing the former into the opened carton at a predetermined point in its travel and mechanical means for holding the former in its position within the carton.

75. In a machine of the character described, means for feeding in a collapsed carton, means for opening up the carton, a former traveling in an endless path, fluid pressure means for forcing the former into the opened carton at a predetermined point in its travel and mechanical means for holding the former in its position within the carton.

76. In a machine of the character described, means for feeding in a collapsed carton, an endless carrier traveling in a path offset from the path of the carton, a former mounted on said carrier, means for opening up a carton and bringing it into alinement with the former, fluid pressure means for forcing the former into the opened carton and mechanical means for holding the former in its position within the carton.

77. In a machine of the character described, means for feeding in a collapsed carton, an endless carrier traveling in a path offset from the path of the carton, a cylinder mounted on said carrier, a former having a piston fitted to reciprocate in said cylinder, means for opening up the carton and bringing it into alinement with the former and means for admitting fluid pressure to the cylinder at a predetermined point to force the former into the opened carton.

78. In a machine of the character described, means for feeding in a collapsed carton, an endless carrier traveling in a path offset from the path of the carton, a cylinder mounted on said carrier, a former having a piston fitted to reciprocate in said cylinder, means for opening up the carton and bringing it into alinement with the former, means for admitting fluid pressure to the cylinder at a predetermined point to force the former into the opened carton and mechanical means for holding the former in its position within the carton.

In testimony, that we claim the foregoing as our invention, we have signed our names in presence of two witnesses, this 11th day of August, 1913.

THEO. E. KNOWLTON.
PETER H. MacCORQUODALE.
JAMES H. WYCKOFF.
CLARENCE H. RUSSELL.
JOHN N. TOOKER.

Witnesses:
C. R. ALVORD,
E. A. SCHROEDER.